United States Patent [19]

Briddell

[11] Patent Number: 4,483,046

[45] Date of Patent: Nov. 20, 1984

[54] CRAB MEAT PROCESSING MACHINE

[76] Inventor: Charles D. Briddell, 335 Hill-N-Dale Dr., York, Pa. 17403

[21] Appl. No.: 383,780

[22] Filed: Jun. 1, 1982

Related U.S. Application Data

[63] Continuation-in-part of Ser. No. 180,002, Aug. 21, 1980, abandoned.

[51] Int. Cl.³ .............................................. A22C 7/00
[52] U.S. Cl. ......................................... 17/32; 17/71; 425/292; 425/296; 425/576; 426/513
[58] Field of Search .................. 17/32; 426/512, 513, 426/292, 295, 296, 297, 298, 308, 309, 311; 425/292, 296, 576

[56] References Cited

U.S. PATENT DOCUMENTS

| | | | |
|---|---|---|---|
| 2,324,202 | 7/1943 | Felton | 17/32 |
| 2,555,232 | 5/1951 | Guice et al. | 99/111 X |
| 2,670,296 | 2/1954 | Tansley | 426/513 X |
| 2,787,832 | 4/1957 | Conway | 17/32 X |
| 3,230,579 | 1/1966 | Johnston | 17/32 |
| 3,324,550 | 6/1967 | Wilsey | 17/32 X |
| 3,852,505 | 12/1974 | Rubin | 426/512 X |
| 3,863,017 | 1/1975 | Yueh | 426/513 X |
| 4,068,008 | 1/1978 | Orchard | 426/513 X |
| 4,092,435 | 5/1978 | Teijeiro | 426/296 |

Primary Examiner—Willie G. Abercrombie
Attorney, Agent, or Firm—C. Hercus Just

[57] ABSTRACT

A machine to form lump-type crab meat from smaller particles of cooked crabmeat by extruding the same under pressure from a cylinder having a discharge nozzle adjoining a die plate having one or more contoured cavities in a flat face thereof and movable past said nozzle to receive compressed crab meat particles in compact congealed condition for molding into a desired configuration resembling natural lump-type commercial crab meat. A knife member on a slide shears the molded lump of crab meat from the extrusion end of the discharge nozzle and sealing means on it prevent appreciable escape of natural juices of the crab meat from the molded lumps, and ejecting plungers having contoured ends form part of the molding surfaces of the die cavities and are reciprocable to eject the molded lumps when the die plate is moved to clear the die cavities from said discharge nozzle.

21 Claims, 13 Drawing Figures

CRAB MEAT PROCESSING MACHINE

REFERENCE TO RELATED APPLICATION

This application is a continuation-in-part of pending application, Ser. No. 180,002, filed Aug. 21, 1980, now abandoned. Any portions of such parent application not included herein are incorporated by reference.

BACKGROUND OF THE INVENTION

For many years, crab meat has been enjoyed by many types of people when the crab meat has been prepared in various ways such as by cracking and picking the shell of steamed crabs. The preparation of crab meat commercially also has been engaged in for many years by professional pickers, who develop a skill for removing the two back fin lumps of crab meat which are connected to the two swimming legs of the crab, said lumps, when removed with care, being more highly prized by fanciers of crab meat than the smaller pieces of white meat of the crab connected to the legs and other body members. Further, such so-called "lump crab meat" commands a much higher price when sold commercially than smaller pieces of crab meat, as well as the meat removed from the legs of the crab. Actually, all parts of the edible meat of a cooked crab have substantially the same taste irrespective of that part of the body from which the crab meat is obtained.

It also has come to the applicant's attention that quite recently, a process and machine has been developed by which substantially all of the crab meat may be removed from the shell but incident to this being accomplished, the choice and preferable large lumps are disintegrated into much smaller particles, thereby reducing the value of the product as compared with that of so-called commercial lump crab meat. This situation, however, has given impetus to the present invention, which is concerned with the forming of so-called smaller particles of crab meat into configurations of compressed and congealed crab meat in the form of commercial lumps thereof, as described in detail hereinafter. Conditioning the crab meat for the molding thereof is the subject matter of a contemplated application covering the development of another inventor and converting the particles of crab meat into a condition susceptible of being congealed and molded into lumps closely resembling commercial lump crab meat.

The forming of various types of food particles, especially meat, into desired form, is the subject matter of a number of prior patents, covering both procedures and mechanism. For example, it is quite common to mold ground meat into forms of patties or other configurations as described and illustrated in prior U.S. Pat. Nos. 2,324,202 to Felton et al, dated July 13, 1943; 2,670,296 to Tansley, dated Feb. 23, 1954; and 4,068,008 to Orchard, dated Jan. 10, 1978. In these patents, the ground meat material is extruded by power means into certain shapes susceptible of being sliced or otherwise separated from a mass to form individual patties or other shapes of meat products.

It also is known to process and operate upon various types of fish products, including shrimp and other types of fish. For example, in prior U.S. Pat. Nos. 2,555,232 to Juice et al, dated May 29, 1951 and 4,092,435 to Teijeiro, dated May 30, 1978, it is seen that in the first of these patents, it is proposed to add certain chemicals to shrimp meat to act as a preservative, the shrimp material then being cooked and molded and either frozen or canned. In Teijeiro, it is proposed to mix peeled and decapitated small shrimp with certain types of chemicals and/or preservatives and then either flaking, blending or extruding the shrimp material, followed by either buttering or breading the same and partially frying and quick freezing or boiling and quick freezing, with no binder or filler added.

Still another prior U.S. Pat. No. 3,852,505 to Rubin, dated Dec. 3, 1974, discloses a process for preparing molded shrimp from very small shrimp, either with or without fragments of larger shrimp and subjecting this material to various temperatures and then extruding the same through very small apertures and subsequently molding the extruded material, followed by subjecting the same to relatively low temperatures and very low temperatures to produce a molded form resembling natural shrimp in appearance.

One other prior U.S. Pat. No. 3,230,579 to Johnston, dated Jan. 25, 1966, pertains to molding pieces of fish into desirably molded formations such as small steaks.

One further prior U.S. Pat. No. 3,863,017 to Yueh, dated Jan. 28, 1975, discloses a method for preparing shellfish, such as shrimp and lobsters, by breaking up the fish into individual fibers to produce heat-set fibers, cominuting the uncooked fish to form a heat-coagulable paste, mixing said heatset fibers and paste in a desired molded shape, resembling a lobster tail or a natural shrimp.

The present invention differs from the mechanism and procedures described and illustrated in the aforementioned patents and includes mechanism by which particles of crab meat previously cooked in certain ways are formed into shapes closely resembling commercial lump crab meat, and in which the lumps are stable, moist and have a true flavor of natural crab meat, details of the equipment used being set forth hereinafter.

SUMMARY OF THE INVENTION

It is among the principal objects of the present invention to mold particles of crab meat into various desired shapes, including the shape of lumps resembling commercial lump crab meat, the crab meat particles employed with the mechanism of the present invention having previously been processed in certain cooking procedures to prepare the crab meat for molding, as described, and have the same adhere in compressed molded form to an extent that the shape is reasonably stable.

Ancillary to the foregoing object, it is a further object of the invention to provide a molding machine operable upon the previously prepared crab meat particles and including a cylinder into which a mass of the particles are introduced for discharge through a nozzle into a die cavity of desired contoured shape including those closely resembling commercial type so-called lump crab meat, separating the molded configuration from the nozzle by means having seals to prevent escape of natural juices and liquids inherent to the crab meat to maintain the natural flavor thereof, and then discharge the molded lumps of crab meat simulating natural commercial lump crab meat from the molding cavities for further operations, such as heating in a steam tunnel, cooling, packing, storing and the like.

Another object of the invention is to compress the afore-mentioned precooked crab meat particles within a cylinder connected to the above-mentioned discharge nozzle which has an opening generally and preferably complementary to the shape of the open face of the die cavity in which the crab meat particles are molded and the discharge of the crab meat particles from said nozzle being effected by pressure generated by suitable means such as a piston follower member inserted in the filling end of the cylinder, and a closure member for said filling end of the cylinder being tightly attachable to the same to permit the introduction of fluid under pressure to cause the piston follower member to compress the crab meat particles within the cylinder and force them through the discharge nozzle into the above-mentioned molding cavities.

A further object of the invention is to provide the discharge end of the nozzle with a relatively flat surface transverse to the axis of the nozzle and the die member, which includes one or more molding cavities, also having a flat outer surface parallel to said flat surface on said nozzle, and cut-off means in the form of a slide being disposed between said aforementioned flat surfaces on the nozzle and die member and including a passage or opening therethrough which, when disposed axially in alignment with the nozzle discharge opening and die cavity permits the passage of crab meat therethrough to the die cavity, said slide also including a shearing edge slidable relative to the flat surface of the die member to effect a severing of compressed crab meat particles from the compact molded lump of crab meat in the die cavity.

One further object of the invention is to provide a cut-off valve preferably between the filling nozzle and the cut-off knife and movable to closed position immediately after the filling of the molding cavity and before said slide operates, thereby preventing the pressure of the material in the cylinder from affecting the molded lumps of crab meat.

Still another important object of the invention ancillary to the object described immediately above is the provision of sealing means in the form of various shapes of O-rings respectively associated with said slide and the flat surfaces on said nozzle and die member, whereby the endless configuration of the O-rings circumscribe the openings in said relatively movable flat surfaces to prevent the escape of natural juices and fluids from the crab meat incident to being molded in said molding cavities in the die member.

Still another object of the invention is to effect severing of the oncoming crab meat particles from the compressed molded configuration thereof in the die cavity by means of a knife having a cutting edge mounted within a flat cavity in said aforementioned slide to dispose the outer surface of the knife member for slidable engagement with the flat face of the die member in which the die cavity is contained, the cutting edge of the knife being disposed along one edge of the passage opening in the slide which permits communication between the nozzle and die cavity.

Still another object of the invention is to effect discharge of the molded lumps of crab meat from the die cavities by means of a plunger member having one face contoured appropriately relative to and comprising a pair of the contoured molding surface of the die cavity, and operating means being included in the machine to reciprocate said plunger in one direction to eject the molded lump of crab meat from the die cavity, preferably by means of a pneumatic cylinder and piston unit, which, in one embodiment, may include spring means to retract the plunger to operative position following a discharge operation from the die cavity.

One further object of the invention is to provide a die member which is disc-like and of sufficient dimensions to permit the formation of a plurality of molding cavities in the die member, such as at circumferentially spaced locations therein, whereby while one of the die cavities is positioned to receive crab meat particles under pressure as ejected into the die cavity, the other die cavity is removed from contact with the nozzle and is in position for the above-mentioned ejecting plunger to be reciprocated to discharge the molded lump from the last-mentioned molding cavity and, further, said die member preferably is supported on one end of a shaft which is parallel to, but laterally offset from, the axis of nozzle, and actuating mechanism being connected to said shaft to oscillate the same respectively in opposite rotary directions to sequentially dispose the molding cavities in the die member in positions to receive crab meat particles and discharge the molded lumps thereof from one of the molding cavities which is out of communication with the discharge nozzle.

Still another object of the invention is preferably to provide the discharge nozzle with a detachable insert having the desired configuration of discharge opening therein which preferably is complementary to the contour of the open outer face of the molding cavity in the die member, whereby removability of said detachable insert renders the discharge nozzle portion of the machine readily capable of being cleansed and, similarly, the cylinder associated with the discharge nozzle preferably is readily adapted to be cleansed by removing the outer cover therefrom and the follower piston member which preferably is also equipped with one or more O-rings surrounding the periphery thereof and slidable with the interior surfaces of the cylinder.

A still further object of the invention is to provide an additional embodiment of ejecting plunger member from that referred to hereinabove and in which there is provided a greater area of contoured product-engaging head which also is capable of being provided with limited clearance between said head and the adjacent portions of the molding cavities to permit at least limited discharge of fluid from the crabmeat being molded in said cavities, thereby contributing to the density of the molded products, the greater area of the head minimizing possible damage to the molded lumps when moving to discharge the same from the cavities.

One further object of the invention is to provide operating means for the ejecting plungers that is a different embodiment from the mechanism referred to above and which, rather than employ spring means to return the plungers to molding position, fluid means, preferably air, are employed to return the plunger heads to molding position, as well as quickly move them in product discharging direction.

Another object ancillary to the immediate foregoing object is to abruptly stop the discharging movement of the plunger heads when they have pushed the molded lumps from the outermost ends of the molding cavities to provide a jolting action which insures disengagement of the molded lumps from the contoured molding surface of the plunger heads without damaging the molded lumps of crabmeat.

A still further object of the invention is to provide readily disengageable connecting means between a stem on each molding head and the piston rod of the fluid cylinder in order that the plungers may be removed and cleansed with facility incident to all parts of the molding equipment being cleansed at the conclusion of use thereof to produce molded lumps of crabmeat.

DETAILED DESCRIPTION

As referred to hereinabove, the present machine primarily is designed to form from various sized particles of crab meat, especially small particles thereof, congealed and stabilized lumps configured and molded to resemble irregularly-shaped commercial lumps of crab meat adapted to command a much higher price commercially than would be accorded, in general, the smaller particles from which said molded lumps are formed. Especially for purposes of having said particles adhere to each other in a congealed molded manner, it has been found that in conjunction with the molding capabilities of the machine comprising the present invention, it is preferable to process the crab meat particles in a manner comprising the subject matter of an invention somewhat related to the present invention, but developed by a separate inventor. In general, the processing involves partially cooking some of the crab meat particles and substantially completely cooking another quantity of said crab meat particles and blending or mixing the two differently cooked particles in a certain manner described in the contemplated aforementioned additional patent application. The primary purpose of initially cooking said crab meat portions differently is that one portion serves as the binder, while the other portion produces the desirable flavor of fresh crab meat, and the final product is pure crab meat, with no artificial binders or flavor additives.

Figure 1:
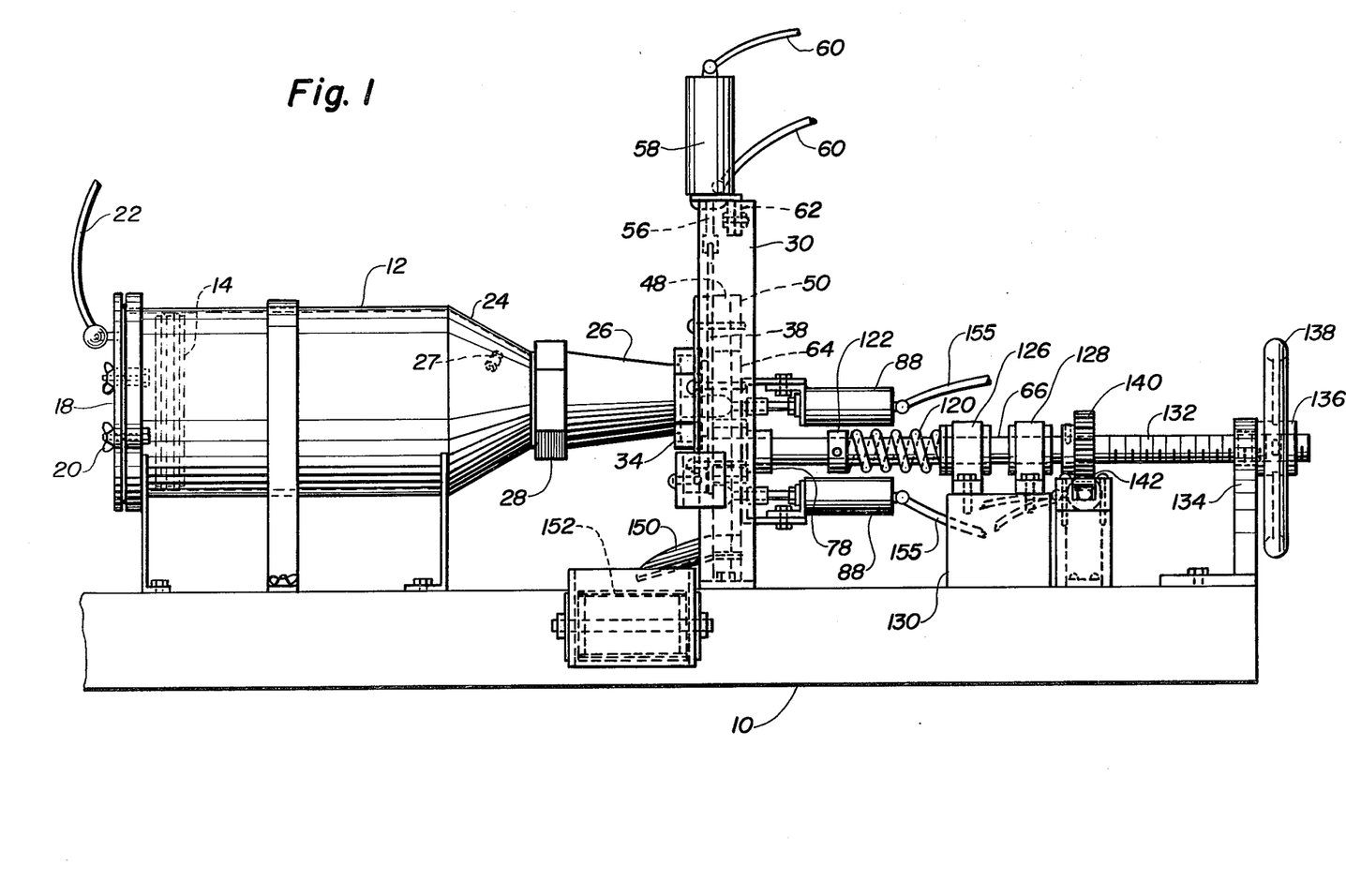
FIG. 1 is a side elevation of a crab meat molding machine embodying the principles of the present invention.
Figure 2:
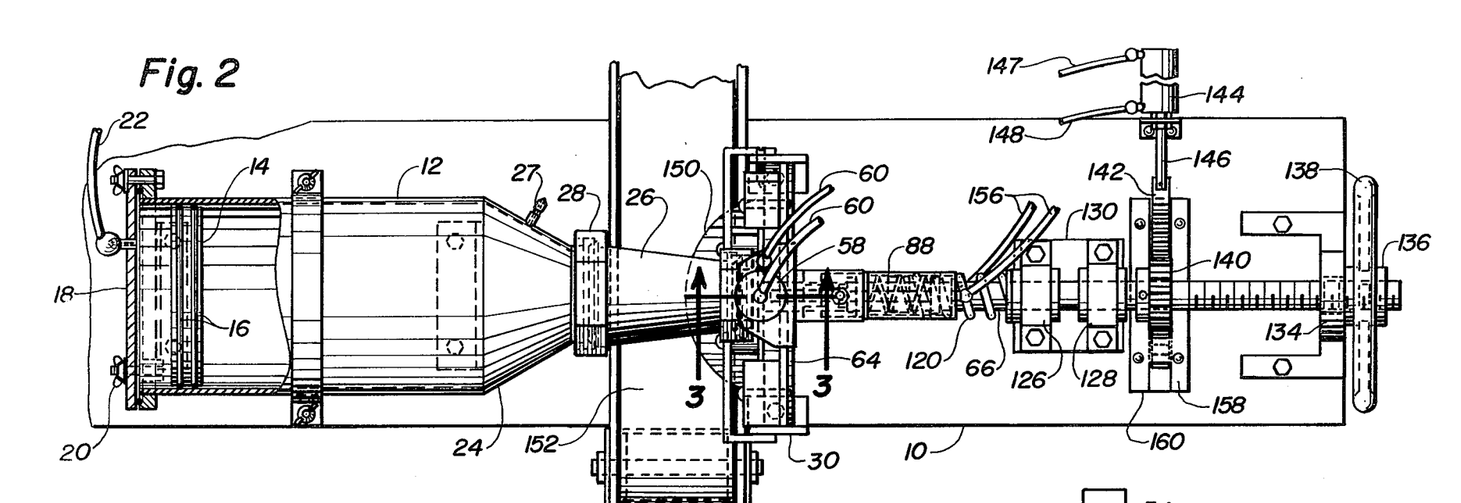
FIG. 2 is a top plan view of the machine shown in FIG. 1, certain portions thereof being broken away to accommodate the view to the sheet.
Figure 3:
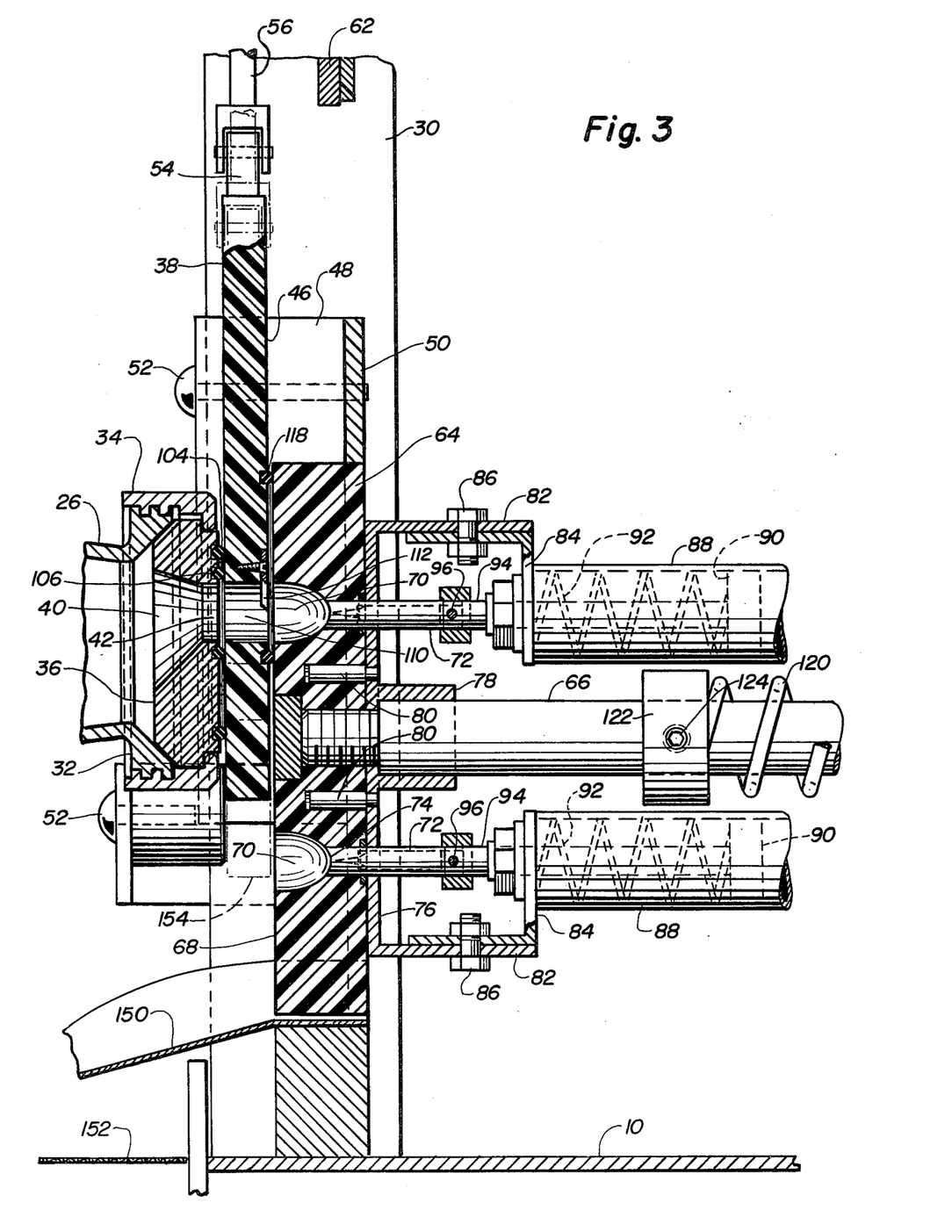
FIG. 3 is a fragmentary vertical sectional view of the midportion of the machine shown in FIGS. 1 and 2, as seen on the line 3—3 of FIG. 2, and illustrated on a larger scale than employed in FIGS. 1 and 2.

For the details of one version of the machine comprising the present invention, attention is directed particularly to FIGS. 1–3 in which a horizontal base 10 is shown. In FIGS. 1 and 2, it will be seen said base supports adjacent the left-hand end, as viewed in said figures, a cylinder 12 of uniform diameter within which a follower-type pistol 14 is slidably mounted, said piston preferably having one or more O-rings 16 surrounding the same to effect desirable sealing between the periphery thereof and the inner wall of the cylinder 12. The aforementioned desired mixture of crab meat particles is introduced into the cylinder when the piston 14 is removed and the cylinder is adequately filled to an extent that will permit the insertion of the piston 14 and then a tight closure 18 is mounted operatively by bolts and wing nuts 20 or any other suitable fastening means. The closure has a port therein to which a fluid conduit 22 is connected, the preferred fluid being hydraulic and supplied from a separate source, not shown, of conventional type.

The opposite end 24 of the cylinder 12 is frusto-conical and connected thereto is a discharge nozzle 26, which preferably is detachable from the cylinder by means of a large clamping nut 28 for purposes of facilitating the cleansing of the interior of cylinder 12 and also for retracting the piston 14 to starting position adjacent the left-hand end of the cylinder as viewed in FIGS. 1 and 2. The nozzle 26 also is preferably somewhat frusto-conical in shape for purposes of facilitating the compression of the crab meat particles incident to being delivered thereto from the cylinder 12 by operation of the piston 14.

As shown in FIG. 2, the frusto-conical end 24 on cylinder 12 is provided with an air inlet valve 27 to permit connection of an air hose thereto to push piston 14 out of the opposite inlet end of the cylinder for purposes of gaining access to either cleanse or fill the cylinder 12. The valve is self-closing.

Figure 4:
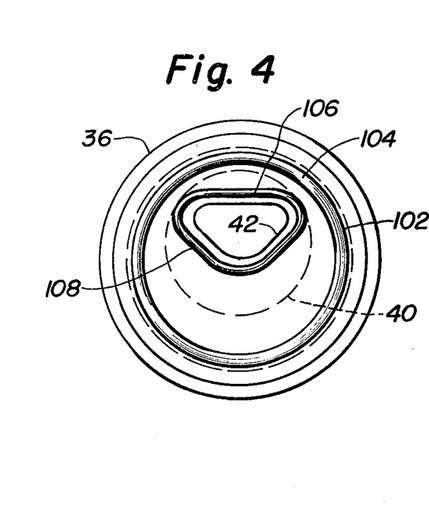
FIG. 4 is a vertical elevation of a detachable insert for the discharge end of the nozzle of the machine shown in the preceding figures, as viewed looking toward said nozzle.

A vertical frame member 30 extends upwardly from base 10 and the lower end of said member is firmly connected to said base. Said frame is for purposes of supporting various cooperating elements described in detail hereinafter. Referring to FIG. 3, it also will be seen that the discharge end of nozzle 26 terminates in a threaded end 32 to which a circular collar 34 is threadably connected for purposes of attaching a circular detachable insert 36 to the nozzle 26 and the outer face of the insert 36 preferably is flat and parallel to an adjacent face of a vertically reciprocable slide 38. The insert 36 also has a discharge opening extending therethrough but the portion 40 thereof, which is nearest the nozzle 26, is frusto-conical in shape and merges with a smaller outlet portion 42 which is preferably of irregular configuration, as best seen in FIG. 4, for purposes of aiding in the shaping of the final molded product of compressed and congealed crab meat particles.

The slide 38 is preferably formed of suitable rigid and durable synthetic resin or plastic material, one highly suitable type comprising ultra high molecular polyethylene (UHNW) of commercial type. The slide 38 is shown in plan view in FIG. 7 and it will be seen that it has parallel opposite edges 44, which are reciprocable within guide grooves 46, machined respectively within vertical guide blocks 48, respectively connected to metallic ribs 50, which are affixed respectively to opposite sides of the frame member 30, the blocks 48 being secured to the ribs 50 by suitable bolts 52, or other conventional means. The guide blocks 48 also preferably are formed from a suitable type of preferably self-lubricating synthetic resin or plastic material, such as that from which the slide 38 is formed, for example.

Slide 38 is provided with an upstanding ear 54, which is attached to the lower end of a piston rod 56 extending downward from a piston, not shown, within the preferably pneumatically operated cylinder 58, as shown in FIG. 1. Opposite ends of the cylinder 58 are each connected respectively to one end of air supply hoses 60 leading from an appropriate conventional air pressure tank, not shown, and suitable control valves, likewise not shown, are inserted in the hoses 60 for purposes of regulating the supply of air respectively to opposite ends of the cylinder 58, in sequence, and scheduled by appropriate sequence control means of conventional type, not shown. The cylinder 58 is supported by a transverse member 62 extending between opposite sides of the frame 30, as shown in FIG. 1.

Figure 8:
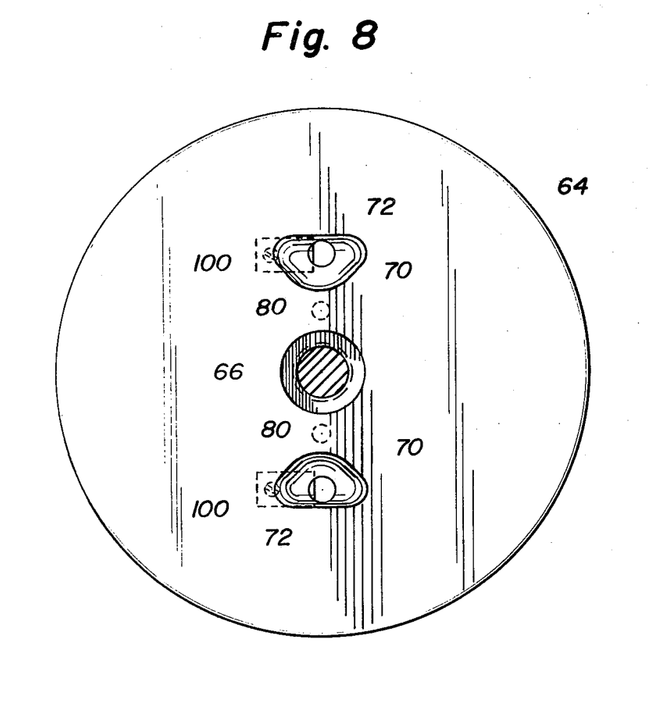
FIG. 8 is a plan view of the inner face of the die member of the machine shown in FIGS. 1–3 and illustrating a pair of exemplary molding cavities formed therein.

A preferably circular die member 64 is secured fixedly to one end of a shaft 66, which is parallel to but laterally offset a limited distance from the axis of the cylinder 12 and nozzle 26. The die member 64 preferably is formed from material similar to that from which the slide 38 is formed, especially to render the same self-lubricating. The die member 64 also preferably is of uniform thickness and especially is provided with a flat outer face 68, and said face has preferably a plurality of molding cavities 70 formed therein, which are contoured in a preferably non-circular configuration which, nevertheless, is shaped to resemble a conventional commercial lump of crab meat. As seen in FIG. 8, in particular, the configuration is somewhat irregular with rounded corners and the cavities preferably are similar but may have variations between the same in order to introduce variety in the shape of the molded crab meat particles produced by the machine. Further, it is contemplated that the cavities 70 may be in the shape of circular and relatively flat concavities suitable to form crab cakes, or even fish cakes therein. Still further, the configuration may be such as to form as closely as possible spherical, ball-like products formed particularly from crab meat particles of the type referred to above and thereby, produce a product suitable to serve as hors d'oeuvres when completely formed in a manner similar to the contoured molded lumps of crab meat produced by the cavities 70.

Figure 5:
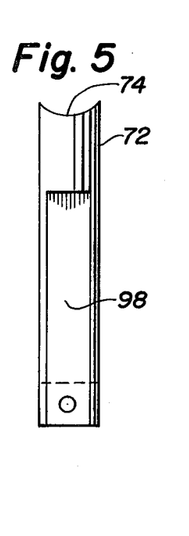
FIGS. 5 and 6, respectively, are vertical plan and side elevations of plungers associated with the molding cavities of the die member operable to eject molded crab meat lumps from said molding cavities.
Figure 6:
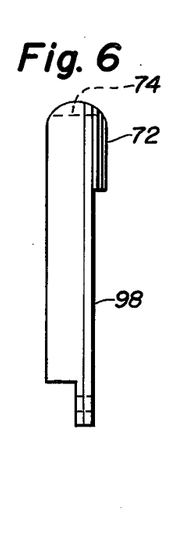

The machine is provided with ejecting means comprising preferably plungers 72, shown in detail in FIGS. 5 and 6, the plungers having one end provided with a contour 74, which comprises part of the interior contour of the cavities 70 shown in FIG. 3, when the plungers 72 are disposed in operative position which is that illustrated in FIG. 3.

The die member 64 preferably is attached to the shaft 66 by means of a metal bracket 76, which is substantially U-shaped, as shown in FIG. 3, and a socket 78 is integral therewith for purposes of receiving the terminal end of the shaft 66. Suitable means such as pins 80 are fixed within sockets extending into the die member 64 from the face thereof opposite the flat outer face 68 thereof, and the outer ends of said pins are received within complementary holes in the intermediate portion of bracket 76 for purposes of preventing rotation between the die member 64 and shaft 66. Socket 78 between shaft 66 are fixedly connected by any suitable means, such as a set screw, not shown. Further, the legs 82 of bracket 76 respectively have one leg of L-shaped brackets 84 connected thereto, such as by bolts 86 and perpendicular legs thereof are fixed to the inner ends of pneumatic cylinders 88, which contain pistons 90, shown in FIG. 3, as well as compression springs 92, which surround piston rods 94, the outer ends of which are connected by pins 96, or otherwise, to the outer ends of the plungers 72 for reciprocation of said plungers in timed sequence described hereinafter. It will be understood that the outer ends of the cylinders 88 are connected to appropriate compressed air supply means, not shown, which, when applied to the cylinders, will project the plungers 72 in discharging direction to eject molded lumps of crab meat from the molding cavity 70, following which the springs 92 will retract the plungers 72 to the initial starting position, illustrated in FIG. 3.

Figure 9:
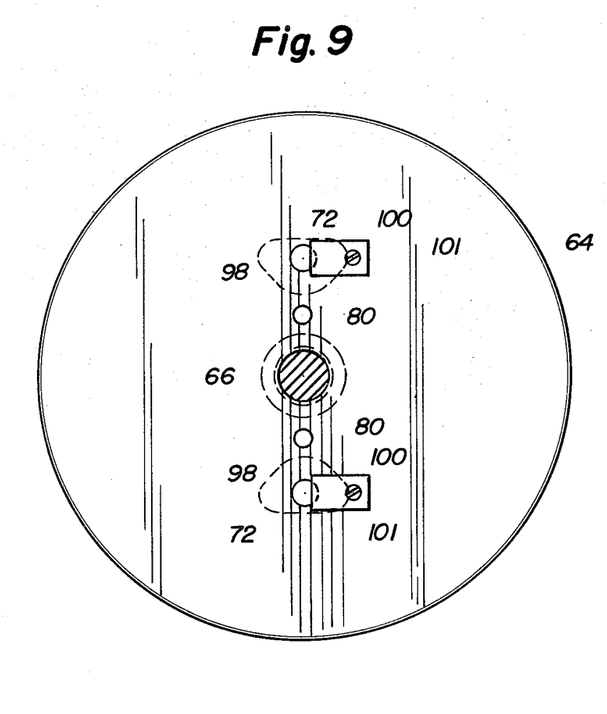
FIG. 9 is the reverse face of the die member illustrated in FIG. 8.

For purposes of maintaining the plungers 72 against rotation, it will be seen particularly from FIGS. 5 and 6 that each plunger has a recessed flat surface 98 extending for the major portion of its length. As best shown in FIGS. 8 and 9, the die member 64, on the opposite face thereof from the slide 38, has a pair of flat guide keys 100 secured thereto by screws 101 and as best seen in FIG. 9, one end of said keys respectively is slidably engaged by the flat surfaces 98 on the plungers 72 and insure the accurate maintenance of the contoured ends 74 with respect to the adjacent portions of the contoured inner surfaces of the molding cavities 70 when the plungers are in retracted, operative position, as shown in FIG. 3.

SEALING MEANS

One of the essential aspects of the present invention is concerned with the maintenance of the natural moisture and juices inherent in picked crab meat, particularly when it is considered that the crab meat particles to be molded are subjected to very substantial pressures within the cylinder 12, the frustoconical end portion 24, and the discharge nozzle 26, incident to being discharged into the molding cavities 70. Such pressures preferably are within the range of between 25 and 100 p.s i. and an optimum pressure of about 60 p.s.i.

Figure 7:
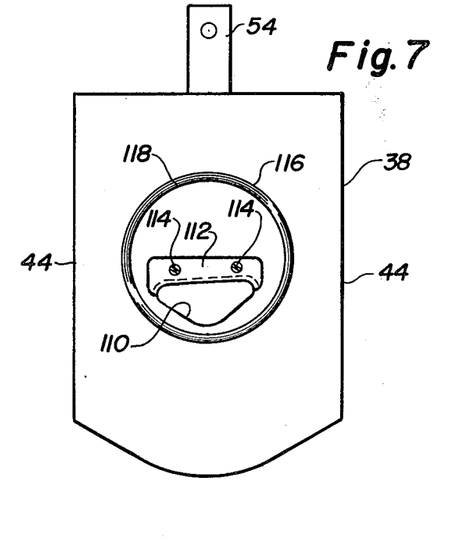
FIG. 7 is a vertical view of one surface of a slide member embodying shearing mechanism disposed between the discharge nozzle and die member, as seen looking toward the nozzle from said die member.

Accordingly, the relatively movable parts associated with the discharge mechanism of the machine are provided with effective sealing means against the passage of fluid. Said sealing means are best illustrated in FIGS. 3, 4 and 7 and comprise three different O-rings respectively of different sizes. The outermost flat surface of the detachable insert 36 is provided with a circular groove 102, which accommodates a portion of the thickness of a first O-ring 104, which is of substantial diameter and encompasses a smaller, second O-ring 106 of irregular shape, which surrounds the irregular opening comprising the outlet 42 of the detachable insert 36. The O-ring 106 is contained for a portion of its thickness within a complementary groove 108, as best seen in FIG. 4. The O-rings 104 and 106 firmly and slidably engage the flat surface of slide 38 which is nearest the detachable insert 36.

The reciprocable slide 38 has an opening 110 therein which is complementary in shape to the opening 42 in the detachable insert 36 of the discharge nozzle. Along one edge thereof, a knife blade 112 is mounted having a sharpened edge adjacent one side of the opening 110. The blade preferably is recessed in the surface of the slide 38, which is opposite the insert 36, as best shown in FIG. 3, and the outer surface of the knife blade preferably is flush with the surface of the slide 38 in which it is recessed and screws 114, shown in FIG. 7, secure the blade in operative position within its recess.

Also formed within the same surface of slide 38 as the blade 112 is a circular groove 116, see FIG. 7, which accommodates a third O-ring 118, which is circular, and circumscribes the opening 110 and knife blade 112 for sliding engagement against the inner surface of die member 64, as clearly shown in FIG. 3. The various O-rings just described hereinabove are formed of conventional material capable of relatively long wear and especially in view of the fact that slidable contact thereof is with synthetic resin or plastic material, which preferably is of a self-lubricating nature, long life of the O-rings, as well as effective sealing results.

To insure that effecting sealing exists in the sealing mechanism described immediately above, the shaft 66, which carries the die member 64 on one end thereof is urged toward the slide 38 and discharge nozzle 26 by a coiled compression spring 120, which surrounds the same and extends between a collar 122, attached by a set screw 124 to the shaft 66 for adjustable positioning of the collar thereon. The opposite end of the spring 120 abuts one of preferably a pair of circular guide bearings 126 and 128, which are connected to the upper end of a fixed pedestal 130, attached to base 10, as best shown in FIG. 1. Also as shown in FIG. 1, the outer end portion of shaft 66 has threads 132 thereon and said threaded end extends through suitable hole in fixed vertical abutment member 134, against which one end of the hub 136 of a tension adjusting wheel 138 abuts.

DIE OPERATION

Referring particularly to FIGS. 1 and 2, it will be seen that the shaft 66, outwardly from the bearing 128, carries a spur gear 140, which is suitably fixedly connected thereto for oscillation of the shaft by means of a transverse rack 142, which is actuated by a fluid-operated cylinder 144 and piston therein provided with a piston rod 146 that is connected to one end of the rack 142. The fluid cylinder 144 is double-acting and has fluid conduits 147 and 148, respectively connected to opposite ends thereof for reciprocation of the piston and piston rod, as well as the rack 142, in opposite directions in timed relationship with the operation of the cylinder 58 which actuates slide 38. The operation of the machine is such that it is controlled by fluid control valves in a circuit, not shown, which is operable to sequentially dispose one of the molding cavities 70 in axial alignment with the discharge opening 42 of special shape in detachable insert 36 and the opening 110 in slide 38. When in this position, another of the molding cavities 70 is in the lower position thereof, shown in FIG. 3, for example, in which it is positioned to have the molded crab meat lump discharged therefrom by reciprocation of the plunger 72 associated with said molding cavity 70 by the operation of the pneumatic cylinder 88 connected thereto. The discharged molded lump drops onto guide chute 150, for example, which directs the same onto a transverse means, such as horizontal flexible belt 152.

In view of the fact that the crab meat particles within the cylinder 12 are constantly under pressure affected by the hydraulically operated piston 14, it can be appreciated that a highly effective sealing means against the passage of fluid and juices is essential, while the slide 38 is reciprocating between the position shown in FIG. 3 and a lowered position 154, shown in phantom in FIG. 3, for purposes of causing the knife 112 to shear the crab meat within the opening 110 in slide 38 from the molded portion thereof disposed under pressure in the molding cavity 70 aligned with the opening 110 in slide 38 when in the elevated position, shown in FIG. 3. The descending movement of the slide 38 preferably is rapid as caused by timing means in the operating circuit, not shown, which controls the operation of cylinder 58, following which the cylinder immediately restores the slide 38 to its uppermost position, shown in FIG. 3, and immediately thereafter, the die member 64 is oscillated by movement of the shaft 66 as affected by cylinder 144 and rack 142 for purposes of moving the empty molding cavity 70, shown in the lower portion of FIG. 3, to the uppermost position opposite the opening 110 in slide 38 in its elevated position, also shown in FIG. 3, and such oscillation of the die member 64 disposes the filled molding cavity 70 in the lower position shown in FIG. 3 for operation of the plunger 72 associated therewith to discharge the molded lump of crab meat from said cavity. Cylinders 88 are operated appropriately in discharging direction for the plunger 72 by means of fluid under pressure transmitted through conduits 155, shown in FIG. 1.

Reciprocation of the rack 142 occurs in a horizontal slide bearing carried by the upper end of a fixed pedestal secured to the base 10, as shown in FIGS. 1 and 2 immediately below spur gear 140.

Following the development of the embodiment of the invention described hereinabove, especially as illustrated in FIGS. 1–10, further experimentation has revealed that improvements can be made in the lump crab meat product achieved by the invention by varying certain elements thereof and by operating the same by slightly different means from those illustrated above. These changes from the foregoing embodiment are set forth as follows, in relation to FIGS. 10–13, which illustrate the changes. In the main, the basic elements of the embodiment of the machine embracing said changes are the same as those in FIGS. 1–10 and described hereinabove, the changed elements having different reference numerals applied thereto, as follows:

The principal change comprises that part of the machine which ejects the molded shapes of crab meat and the mechanism which actuates the same. In the preceding embodiment of the invention illustrated in FIGS. 1–9, the ejecting plungers 72 are circular in cross-section and the outer end 74 thereof is contoured to comprise part of the contour of the entire molding cavity 70. In the embodiment shown in FIGS. 10–12, ejecting member 156 comprises a head which, in cross-section, is substantially rectangular and extends transversely across the molding cavities 70, as clearly shown in FIG. 11, in which it will be seen that the cavities are substantially triangular in shape, and the head 156 extends between and preferably beyond the apex of one angle and the flat side opposite the same. As best shown in FIG. 12, the outer surface 158 of the head 156 is arcuate and actually is somewhat partially spherical in configuration so as to comprise part of the overall curved configuration of the molding cavity 70 which, as indicated hereinabove, closely resembles the shape of a natural lump of back fin crab meat, but other shapes such as balls may be formed by suitable shapes of the cavities.

Figure 10:
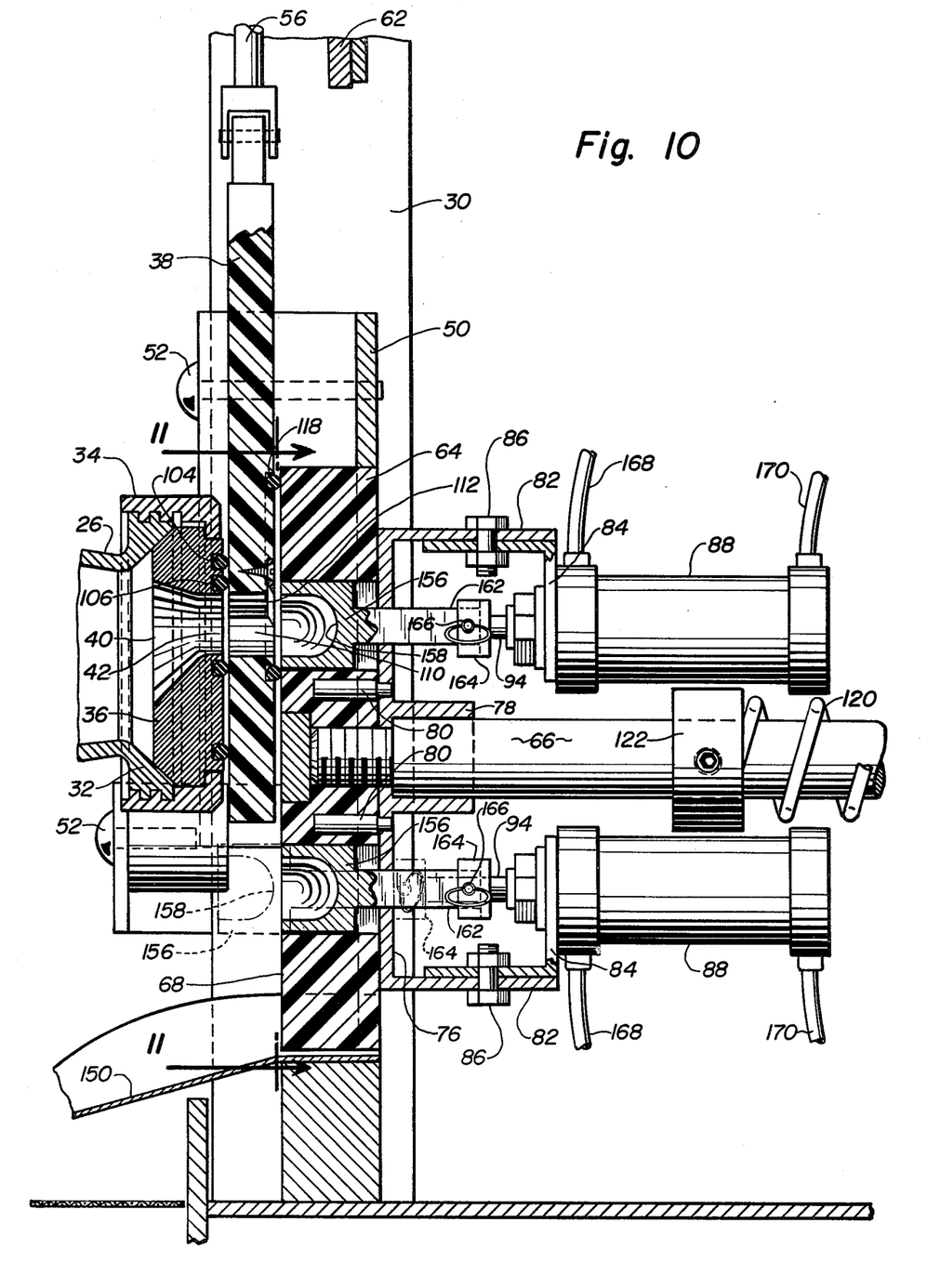
FIG. 10 is a fragmentary vertical sectional view of the midportion of the machine shown in FIGS. 1 and 2, as seen on the line 3—3 of FIG. 2 and line 10—10 of FIG. 11, and is similar to FIG. 3, but showing different embodiments of molding cavities, ejecting plunger members and fluid-operating means therefor from those shown in FIG. 3.
Figure 11:
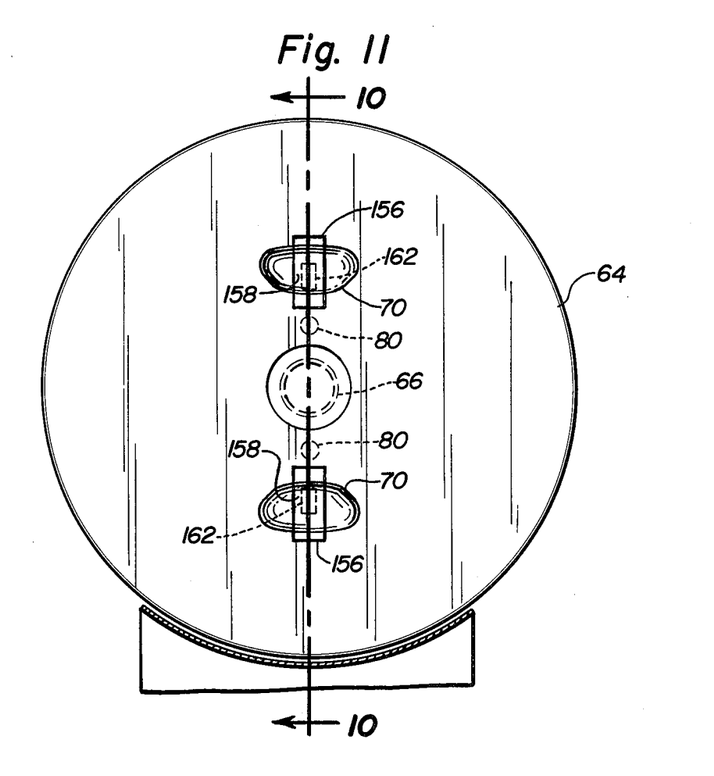
FIG. 11 is a vertical elevation of the embodiment of die member shown in FIG. 10, as seen on the line 11—11 thereof, and illustrating the inner face thereof in which said different embodiments of exemplary molding cavities and heads of ejecting plunger members are shown.
Figure 12:
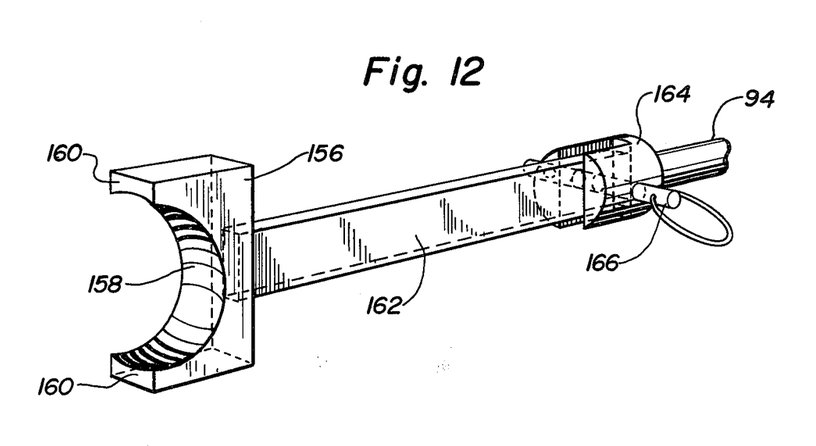
FIG. 12 is a perspective view of one of the embodiments of ejecting plunger members shown in FIGS. 10 and 11, and illustrating in particular the contoured surface of the head of the plunger and the stem which supports and actuates said head.

From the line 10—10 in FIG. 11, it will be seen that particularly in the area of the die member 64, FIG. 10 is a vertical sectional view in which the outer ends 160 of the heads 156, shown in FIG. 12, are flush with the surface of the die member nearest slide 64, as viewed in FIG. 10, and are maintained in that position when receiving crab meat from the discharge nozzle 26 of the cylinder 12 through the opening 110 in the reciprocable slide 38. In the ejecting position, which occurs when the die member 64 has been rotated or oscillated to move a filled molding cavity 156 to the lower position, shown in FIG. 10, the hydraulic cylinder 88 connected to the lowermost head 156 will project the same to the phantom position shown in the lower portion of FIG. 10 and it has been found that the particular shape of the arcuate outer surface 158 of the head 156 serves to dislodge the molded lump of crab meat relatively free from damage.

At the time the crab meat is forced into the molding cavity, the cavity includes air which is somewhat trapped by the oncoming crab meat. To provide ready escape thereof in order to permit compact filling of the cavity, there is a limited clearance provided especially between the sides of the head of ejecting member 156 and the adjacent sides of the openings in the molding cavities 70 which receive the heads and actually comprise a part of said molding cavities.

Further to assist in separation of the molded lump of crab meat from the arcuate surface 158 of head 156, it will be seen from FIG. 10, and also FIG. 12, that the head 156 of the ejecting member is fixed to the adjacent end of a plunger 162, which preferably is rectangular in cross-section and relatively flat. The end thereof opposite the head 156 is received within a coupling member 164 affixed to the outer end of piston rod 94, which extends beyond the cylinders 88. A quickly detachable locking pin 166 extends through aligned holes in the member 164 and plunger 162 for easy disengagement of the connected members for purposes of facilitating the cleansing of the heads 156 at the end of a given run of the machine, such as at the end of a working day, when all surfaces of the machine which are contacted by the crab meat are thoroughly cleansed.

The coupling member 164 also serves an additional function which is to limit the ejecting movement of the heads 156. As can be seen in the lower portion of FIG. 10, in phantom, when the head 156 has been moved to ejecting position, as shown in phantom in said figure, the coupling member 164 abuts the outer surface of the metallic bracket member 76 and this is accomplished abruptly for purposes of jarring the molded lump of crab meat from engagment with the surface 158 of the head 156, whereupon the molded lump of crab meat drops to the guide chute 150 for removal from the machine and further handling, such as packaging, freezing, storing, and the like.

Another difference between the embodiment of the invention shown in FIGS. 1–9 and that shown in FIGS. 10–13 resides in the fact that the first embodiment utilizes a spring 92 to effect return of the piston, as well as the plungers 72, to the initial starting or molding position. In the embodiment, shown especially in FIG. 10, it will be seen that the fluid-operated piston and cylinder units 88 are double-acting and the piston in each is moved successively in opposite directions by fluid, preferably air, introduced through conduits 168 and 170, for quick and effective movement of the plungers 162 and the ejecting heads 156 thereon to the molding position shown in FIG. 10 in solid lines and subsequently to the ejecting position shown in phantom in said figure, with the added advantage of the jarring stop of the heads 156 when extended through ejecting position as caused by the engagement of the coupling members 164 with the brackets 76, as explained hereinabove.

Figure 13:
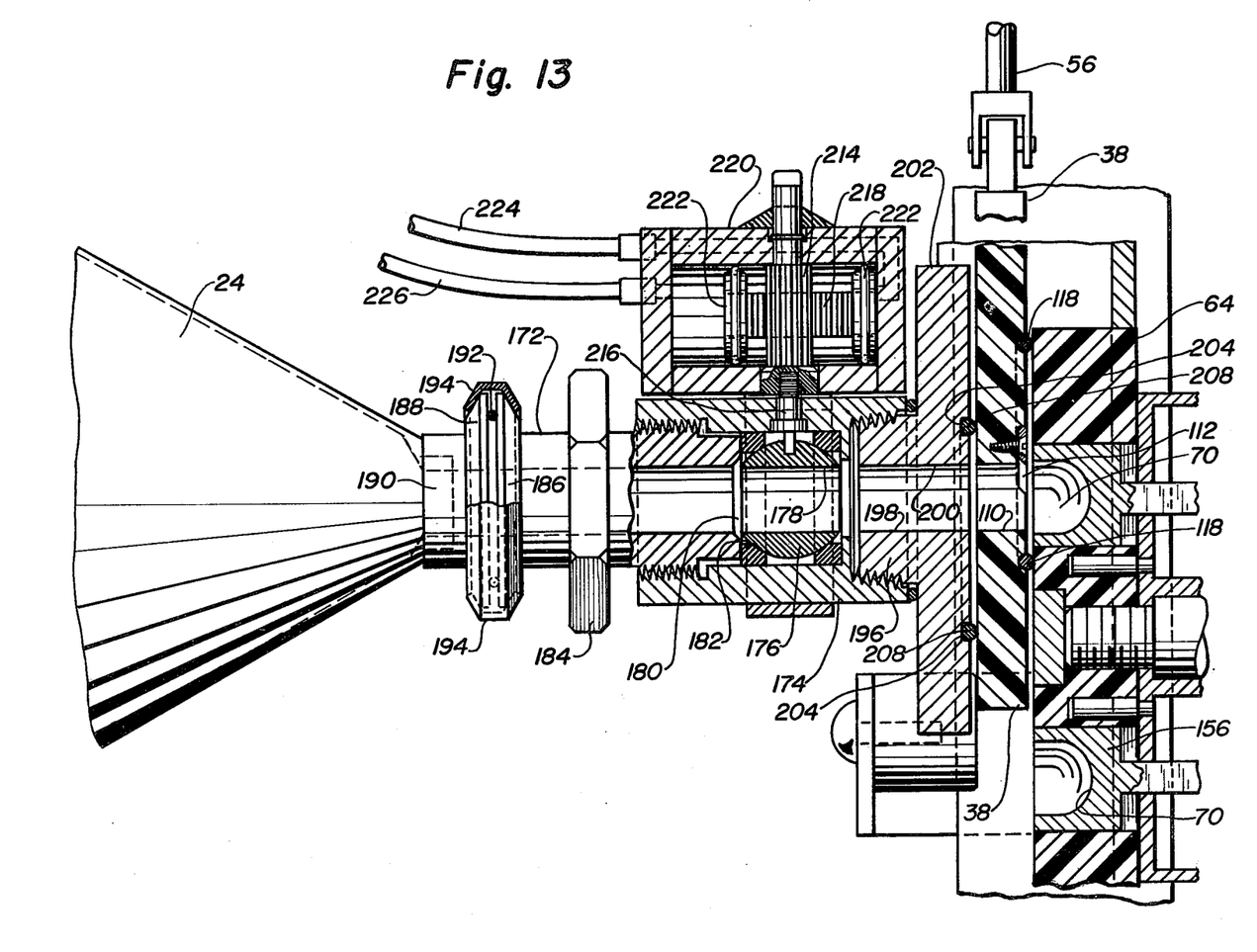
FIG. 13 is a fragmentary enlarged side elevation of the discharge region of the cylinder and cut-off knife in which a pressure-relieving cut-off valve is illustrated, partly in section.

Another advantageous feature of the invention is illustrated in detail in FIG. 13 and concerns the manner in which the crab meat particles in cylinder 12 are controlled incident to being discharged therefrom into molding cavities 70. In view of the fact that, in the preferred operation of the molding operation, pressure upon the contents of cylinder 12 is substantially constant, the sealing devices such as the various O-rings are subjected to such pressure. If slightly worn or, otherwise the rings are not functioning properly, it is conceivable that some of the liquids in the mass of material being molded will squirt past such sealing rings in an undesirable manner. To minimize and preferably prevent such escape of liquid past the sealing rings, the following innovation has been developed.

Referring to FIG. 13, it will be seen that a modification has been made between the discharge end 24 of cylinder 12 and the reciprocating slide 38 which carries the knife blade 112. In effect, the specific nozzle 26 of the preceding embodiment has been replaced by a modified nozzle 172 which is connected at its forward end to the body of cut-off valve 174, one end of said nozzle being threaded into the adjacent end of said body. One convenient form of cut-off valve is known in the trade as a ball valve and comprises a sphere or ball 176 through which a circular bore 178 extends transversely for open and shut relationship relative to the axial passage 180 in the valve body 174, the ball 176 being rotatably supported in a complementary seat 182 in the valve body.

For ease of connection, the exterior of the body of valve 174 is hexagonal or other suitable shape and, similarly, nozzle 172 has a hexagonal or similar flange 184. The nozzle 172 also has a bevelled flange 186 opposite the threaded end thereof and it abuts a similar flange 188 on the discharge end 190 of the end 24 of cylinder 12. A sealing O-ring 192 or the equivalent is disposed between the flanges and the latter are connected in sealing engagement by conventional means such as a plurality of arcuate channelled members 194 which are pivotally connected at one of the ends thereof, and the opposite ends are connected operatively by toggle means or the like, not shown. Such means permit ready disconnection of nozzle 172 from the cylinder end 24 for cleansing or otherwise.

The discharge end of the body of valve 174 is connected to a threaded boss 196 having a bore 198 therethrough in alignment with passage 180 and coaxial with opening 200 in a transverse flange 202 fixed to boss 196 and parallel to knife slide 38. Flange 202 is similar in function to the attachment insert 36 of the preceding embodiment but has only a single groove 204 therein, corresponding to groove 104 in said preceding embodiment, to receive a large diameter O-ring 208 which slidably engages one surface of reciprocating knife slide 38 and surrounds opening 200 in flange 202, as well as opening 110 in slide 38 which reciprocates vertically relative to stationary flange 202.

The valve ball 176 is rotated through an arc of 90° between open and shut positions. This is accomplished by any suitable means such as an elongated pinion gear 214 on a shaft 216 which extends upwardly from valve ball 176 and is non-rotatably fixed thereto. A short piston-actuated rack 218 slides in a cylinder body 220 which contains a fluid operated piston 222 slideable in a bore therein. Fluid conduits 224 and 226 extend from body 220 in conventional manner for operation of a solenoid valve, not shown, which is in circuit of conventional type with the operation of cylinders 88 of several embodiments respectively shown in FIGS. 1 and 10. The operation of cut-off valve 174 is as follows.

During the operation of the machine, in regard to valve 174, when a cavity 70 is aligned with opening 200 of flange 202 to receive crab meat therefrom, valve 174 is open to permit the pressure on the supply in cylinder 12 to force the crab meat through the aligned openings 200 and 110 and fill the molding cavity 70 in die member 64. Immediately prior to the descent of knife slide 38, which is effected by cylinder 58, to sever the supply from the crab meat in the molding cavity, shut-off valve 174 is instantly closed to prevent the pressure from the supply in cylinder 12 from causing liquid or juices in the crab meat disposed in the aligned passages and openings to tend to squirt past the sealing O-rings or in any other way cause an undesirable effect from such pressure as is possible were valve 174 not present in the machine. As a result of the inclusion of valve 174 in the machine, very effective sealing by the various O-rings 118 and 208 is made possible, especially in the embodiment shown in FIG. 13, in which one less O-ring is required than in the embodiment shown in FIGS. 3 and 10. Otherwise, the embodiment of the invention shown in FIGS. 10-13 is the same as that of the preceding embodiment, and it will be understood that the die member 64 and the cylinder units 88 fixedly connected thereto are rotated or oscillated by the shaft 66, as caused by the spur gear 140 and rack 142, the rack being actuated by the fluid cylinder 144, as described hereinabove.

From the foregoing, it will be seen that the present invention is relatively simple, yet highly effective and durable to produce molded lumps of crab meat particles which are congealed and capable of being maintained in stable condition, primarily by the composition of the molded lumps consisting of differently prepared portions of the crab meat particles which are intermixed in accordance with the aforementioned invention of a different inventor from the instant applicant, which cooking process and mixture provides both a binding effect upon the crab meat particles, and also preserves the natural crab meat flavor without the addition of an auxiliary or supplemental binding material or flavoring additives and the sealing means incorporated in the machine comprising the present invention retains the natural liquids and juices of the crab meat and thereby further contributes to the flavor thereof.

The foregoing description illustrates several preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A machine to form commercial-type lumps of crab meat from particles of crab meat smaller than commercial lumps thereof and comprising in combination, a cylinder adapted to receive cooked crab meat particles in moist condition and having a receiving end and an opposite discharge end, a piston reciprocable in said cylinder, a discharge nozzle of constricted size relative to said cylinder through which said cooked crab meat particles to be discharged is connected to one end of said cylinder, means to reciprocate said piston toward said discharge nozzle, a circular die member having a flat face and at least one molding cavity extending therein from said flat face and having a curved inner wall to produce a desired molded form of crab meat having curved surfaces, means to support said die member upon a shaft and move said die member rotatably by said shaft correspondingly to move said molding cavity into and from a position opposite the outer end of said discharge nozzle to receive compressed moist crab meat particles discharged under pressure from said cylinder and into said molding cavity in compressed form to impart the shape of said cavity to said compressed crab meat, a knife member slidably supported closely between said flat face of said die member and said discharge nozzle, means to reciprocate said knife relative to a filled cavity in said die member to separate the molded lump of crab meat from the meat in said discharge nozzle, moisture retaining sealing means between said molding cavity and knife member and outer end of said discharge nozzle, means operable subsequently to move said die member and cavity to a discharge position, and means to eject said molded form of crab meat from said molding cavity comprising a plunger reciprocable relative to said die member and having a curved contour at least on one end comprising part of the curved inner wall of said molding cavity when said cavity is in filling position, and means operable to reciprocate said plunger toward the face of said die member to cause said contoured end of said plunger to eject a molded crab meat lump from said molding cavity.

2. The machine according to claim 1 in which said sealing means comprises O-ring means positioned between said outer end of said discharge nozzle and said die and knife members and operable to prevent escape of natural juices and fluids from said molded lump of crab meat while being molded into desired shapes thereof.

3. The machine according to claim 2 in which the molding cavity in said die member has a non-planar curved innermost surface, a flat face and said molding cavity being formed in said face and extending inwardly in said die member therefrom, and said flat face of said die member is movable within the plane of said face transversely to the axis of said discharge nozzle during movement of said molding cavity from said discharge nozzle.

4. The machine according to claim 3 further including fluid-operated cylinder means supported by and movable with said die member and operable to move said plunger in discharge direction and additional means subsequently operable to retract said plunger to molding position.

5. The machine according to claim 3 in which said die member is circular and has a plurality of molding cavities therein in circumferentially-spaced locations with respect to each other and of equal radii from the center of said member, and said machine further including means operable sequentially to move said cavities into and from alignment with the outer end of said discharge nozzle respectively to effect filling and discharge of said cavities.

6. The machine according to claim 5 in which said discharge means comprise plungers each having one end forming a section of the curved surface of said molding cavities, and said machine further including means to reciprocate said plungers in one direction to eject molded forms of crab meat therefrom when said cavities sequentially are moved respectively away from the discharge end of said nozzle and subsequently return said contoured ends of said plungers into operative position relative to said molding cavities.

7. The machine according to claim 1 in which said sealing means comprises an O-ring positioned in the face of said knife member and slidable across the flat face of said die member and circumscribing the open face of each molding cavity when disposed in filling position with respect to the discharge nozzle of the machine and operable in all positions of said knife member to prevent loss of crab meat fluids and juices.

8. The machine according to claim 1 in which said knife member comprises a flat member of substantially uniform thickness having parallel opposite surfaces, said flat member being movable between the front face of said die member and a parallel face adjacent the outer end of said discharge nozzle and said flat member carrying a sharpened knife member and having an opening adjacent said knife at least complementary in size to the contour of the open face of said molding cavity and operable prior to cutting movement of said knife to permit passage of crab meat through said opening to said cavity.

9. The machine according to claim 8 in which said knife member comprises a blade having a sharpened edge disposed within a complementary recess extending into said flat member from the surface thereof nearest the flat face of said die member, and said sealing O-rings being mounted between the opposite surfaces of said flat member and the adjacent surfaces of said die member and an outer flat surface on the discharge nozzle, said sealing O-rings circumscribing said opening in said knife member being respectively slidably operable along said flat surfaces of the relatively movable elements hereinabove recited.

10. The machine according to claim 9 further including means to reciprocate said knife member a distance at least equal to the transverse dimension of the outer face of said molding cavities to enable the cutting edge of said blade to sever the pressed crab meat in said opening in said flat member and the molded compressed crab meat in said molding cavity in said die member.

11. The machine according to claim 8 in which said circular die member is supported on one end of a shaft parallel to the axis of the discharge nozzle but offset therefrom, and said means to sequentially move said cavity comprising means engageable with said shaft and operable to oscillate the same in opposite directions respectively and successively to align the molding cavities within the flate face of said die member with said opening in said knife member and the discharge end of said nozzle.

12. The machine according to claim 8 in which the outer end of said discharge nozzle is provided with a flat surface parallel to said knife member and the discharge opening in said nozzle being substantially complementary in shape to the open face of the molding cavity and also being substantially complementary to the shape of the opening in said knife member.

13. The machine according to claim 12 in which said shapes of said outer face of said molding cavity and the openings in said discharge nozzle and knife members are non-circular and the sealing O-ring means of said machine being arranged with one sealing O-ring surrounding the opening in the flat surface of said nozzle and another larger diameter O-ring circumscribing said first-mentioned O-ring, and still another sealing O-ring mounted in the face of said knife member adjacent the flat face of said die member and circumscribing the open outer face of said molding cavity and also the aforementioned opening in said knife member to prevent leakage of fluids and juices of said crab meat.

14. The machine according to claim 13 further including means to operate said knife member and die member sequentially respectively to align said opening in said knife member axially with the discharge opening in said nozzle and the outer face of said molding cavity in said die member and followed by reciprocation of said knife member to slidably move in shearing manner across the flat outer face of said die member and molding cavity therein, followed by movement of said die member and molded form of crab meat in the molding cavity therein in the direction away from said knife member to clear the flat face of said die member relative to the knife member and permit ejection of the molded lump of crab meat therefrom.

15. A machine to form from particles of crab meat smaller than commercial lumps thereof desired shapes and forms of larger size and comprising in combination, a supply cylinder adapted to receive processed crab meat particles in moist condition and having a discharge end, a discharge nozzle for said crab meat particles on said discharge end of said cylinder, means in said cylinder operable to discharge crab meat particles through said discharge nozzle under pressure, a die member having a flat face in which at least one molding cavity is provided therein with a curved contoured surface having a desired commercial shape, means to move said die member to and from a position closely adjacent the outer end of said discharge nozzle to receive moist crab meat particles therefrom and discharge some of the same under pressure into said molding cavity to impart the shapes of said cavity to said compressed crab meat, a knife member closely slidable between the outer end of said discharge nozzle and said flat face of said die member and having a sharpened edge operable to shear across the crab meat between said nozzle and molded portion of crab meat in said molding cavity to complete the forming of molded lump of crab meat particles resembling commercial lumps thereof, slidable type seal means between said knife member and said discharge end of said nozzle and flat face of said die member and respectively surrounding said end of said nozzle and molding cavity in said die member, a shut-off valve connected to said discharge nozzle, means operable to close said valve at the completion of filling the molding cavity before said knife member moves in shearing direction to disconnect the pressure of the crab meat in said cylinder from the knife means and crab meat molded in said molding cavity, means to move said die member in a direction to separate said molding cavity and molded form of crab meat therein from said discharge nozzle, means to eject said molded form of crab meat from said molding cavity, and means to open said shut-off valve when a molding cavity is next moved into alignment with said discharge nozzle.

16. The machine according to claim 15 in which said molding cavity extends inwardly from said flat face of said die member and said means to eject said molded form of crab meat from said cavity comprising a plunger having a transverse contoured section of said contoured surface of said molding cavity, said section being separately movable relative to portions of said cavity fixed in said die member, said machine further including means to reciprocate said contoured section of said plunger and move it outwardly from said fixed portions of said molding cavity in a direction to discharge a molded form of crab meat from said cavity as aforesaid, and said molding cavity being provided with means to permit escape of air therefrom incident to the cavity being filled with crab meat.

17. The machine according to claim 16 further characterized by said means to permit escape of air from said molding cavity comprises limited clearance between opposite sides of said plunger section of said cavity and the adjacent stationary portions of said cavity of said die, thereby affording limited escape means for air incident to compressibly molding crab meat particles in said molding cavity to compact the same.

18. The machine according to claim 16 in which said section of said contoured surface of said molding cavity extends transversely across said cavity between opposite sides thereof and in side view thereof has a concave surface comprising a portion of the entire composite contoured surface of said molding cavity.

19. The machine according to claim 16 in which said plunger extends from said transverse contoured section thereof away from said die member and said means to reciprocate said plunger comprises a double-acting fluid-operated cylinder and piston unit stationarily mounted upon said die member outwardly from said plunger, means to supply fluid under pressure sequentially to opposite ends of said cylinder to effect reciprocation of said piston therein in opposite direction correspondingly to move said contoured section of said molding cavity in ejecting and retracting directions in timed relationship incident to moving said die member relative to said discharge nozzle of said supply cylinder between die cavity-receiving and product discharge positions of said die member relative to said nozzle.

20. The machine according to claim 16 further including stop means operable relative to said plunger to abruptly stop the ejecting movement of said plunger and head connected thereto and thereby jar molded lumps of crab meat therefrom at the completion of the ejecting movement of said head.

21. The machine according to claim 16 further including a shaft supported in bearings on a stationary base, means connecting said die member to one end of said shaft, bracket means connected to said shaft and supporting said cylinder and piston unit in fixed relationship to said die member for rotation therewith by said shaft, and readily disconnectable means securing said plungers to the rods of said pistons of said units for ease of cleansing the portions of said machine which are in contact with the crab meat handled thereby.

* * * * *